Nov. 9, 1943.  W. A. RIDDELL  2,333,820
PHOTOGRAPHIC SHUTTER
Filed June 17, 1941  2 Sheets-Sheet 1
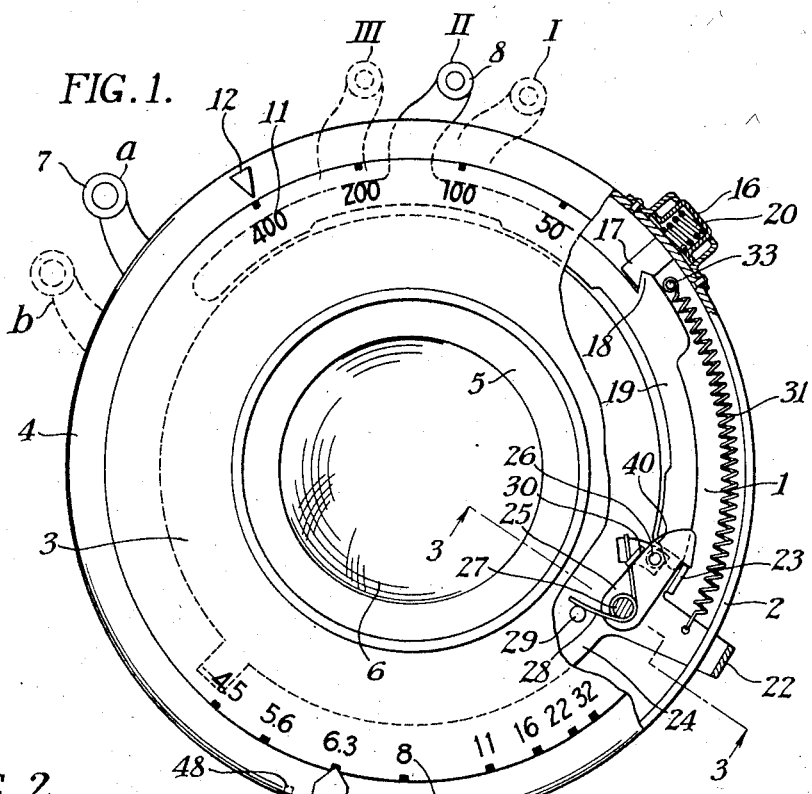
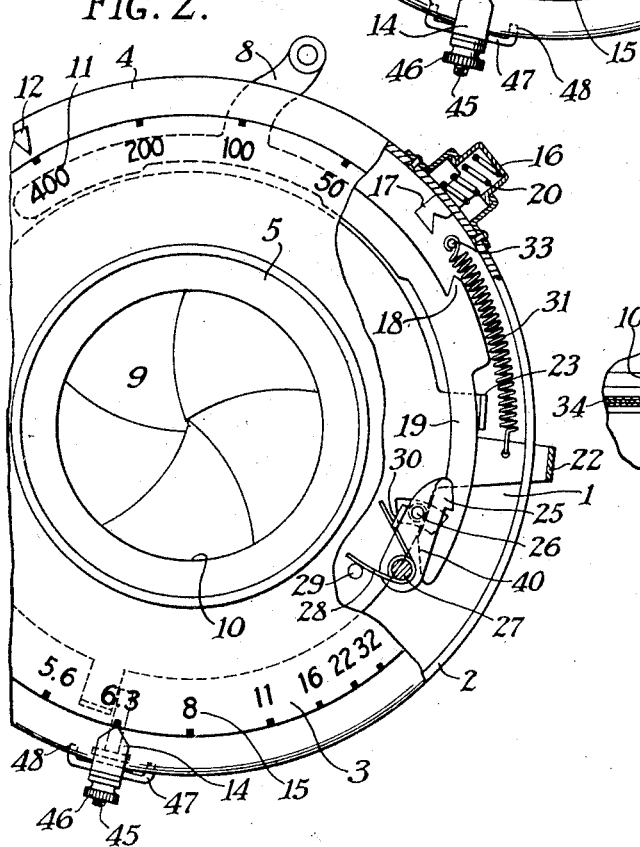
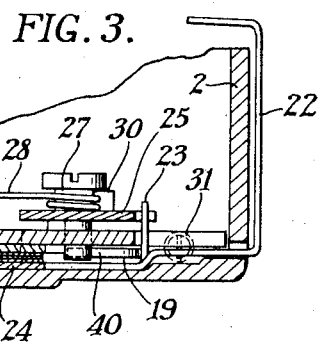
William A. Riddell
INVENTOR
BY
ATTORNEYS Nov. 9, 1943.   W. A. RIDDELL   2,333,820
PHOTOGRAPHIC SHUTTER
Filed June 17, 1941   2 Sheets-Sheet 2

William A. Riddell
INVENTOR

BY
ATTORNEYS

Patented Nov. 9, 1943

2,333,820

UNITED STATES PATENT OFFICE 2,333,820

PHOTOGRAPHIC SHUTTER

William A. Riddell, Rochester, N. Y., assignor to Eastman Kodak Company, Rochester, N. Y., a corporation of New Jersey Application June 17, 1941, Serial No. 398,436

6 Claims. (Cl. 95—63)

This invention relates to photography and, more particularly, to shutters for photographic cameras. One object of my invention is to provide a photographic shutter which is particularly adapted for use on cameras of the type in which focusing may be done on ground glass. Another object of my invention is to provide a shutter in which both the speed and diaphragm settings may be positioned and need not be disturbed during the focusing movement even though the shutter blades must be held open and the diaphragm blades are preferably moved to the wide-opened position to facilitate focusing. Still another object of my invention is to provide a diaphragm so constructed that it tends to move toward a limiting stop which may be set at the desired aperture and to provide a means for returning the diaphragm to the selected stop after the focusing operation is accomplished without further attention from an operator. Other objects will appear from the following specification, the novel features being particularly pointed out in the claims at the end thereof.

I am aware that objectives have been provided with diaphragm lens barrels in which the diaphragms have been spring-moved to a predetermined position by means of a part of the camera mechanism, such as the releasing device for a reflex camera mirror or the like, but I have provided an entirely different combination since I have provided a shutter casing including all the necessary elements to permit focusing through the light aperture of a shutter in a wide-opened position so arranged that the simple act of setting the shutter for an exposure will permit all parts to automatically adjust themselves to the proper position for making a predetermined exposure at a predetermined aperture.

Coming now to the drawings in which like reference characters denote like parts throughout:

Fig. 1 is a front elevation of a camera shutter constructed in accordance with and embodying a preferred form of my invention, parts of the shutter cover being broken away;

Fig. 2 is a fragmentary view similar to Fig. 1 but with the parts in a different position;

Fig. 3 is an enlarged fragmentary sectional view taken on line 3—3 of Fig. 1;

Figure 4:
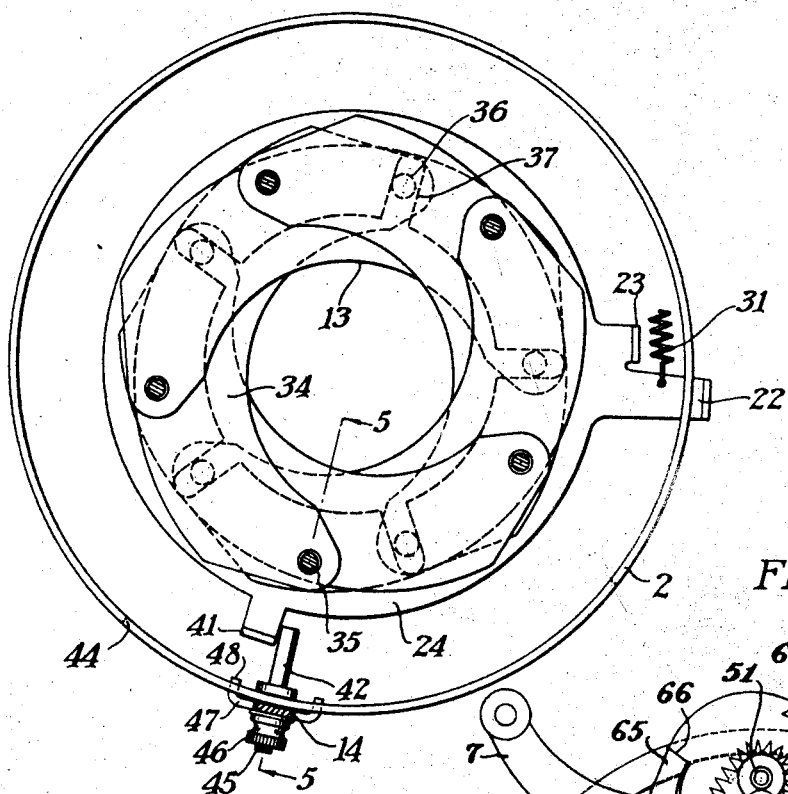
Fig. 4 is a plan view of the shutter casing showing the diaphragm stop and a part of the diaphragm mechanism.

Referring to Fig. 1, the shutter may comprise a shutter casing 1 having an upstanding flange 2, which supports the usual cover plate 3. In the present instance an adjusting ring 4 is movably mounted around the outer edge of the shutter cover plate 3 and a lens cell 5 for carrying one of the components of the objective 6 is mounted in the adjusting ring 4.

The shutter includes a shutter trigger 7 which may move from a position of rest at $a$ to a position shown at $b$ in which the shutter is released to make an exposure. The shutter likewise includes a setting lever 8, this lever being movable between three positions indicated by the numerals I, II and III. Position I is the position the setting lever assumes when the master member of the shutter has been tensioned and is in position for the shutter to make an exposure. Position II is the position the setting lever assumes when the shutter leaves are being held open for focusing as will be hereinafter more fully described. Position III is the rest position which the lever assumes after an exposure has been made in which position it is necessary to set the shutter by moving the lever 8 to the position I before an exposure can be made.

If desired, the shutter mechanism may be of the type shown in my U. S. Patent No. 2,099,366, granted November 23, 1937.

Only such parts of the shutter will be described as is necessary for a complete understanding of the present invention.

In my copending application, Serial No. 336,063, filed May 18, 1940, for "Focusing stop for shutters," I have shown a shutter equipped with a blade arrestor comprising a push button which may be manually depressed for holding the blades of the shutter in an open or focusing position. This application has resulted in Patent No. 2,249,540, granted July 15, 1941. I employ such a mechanism in the present invention.

As indicated in my copending application resulting in Patent No. 2,099,866 the shutter mechanism may consist of a master member 50 pivotally mounted at 51 to the shutter casing, a spring 52 being connected to the master member tending to rotate it in a counter-clockwise direction to drive the shutter blades 9 to and from a position covering the exposure aperture 10 to make an exposure.

Figure 6:
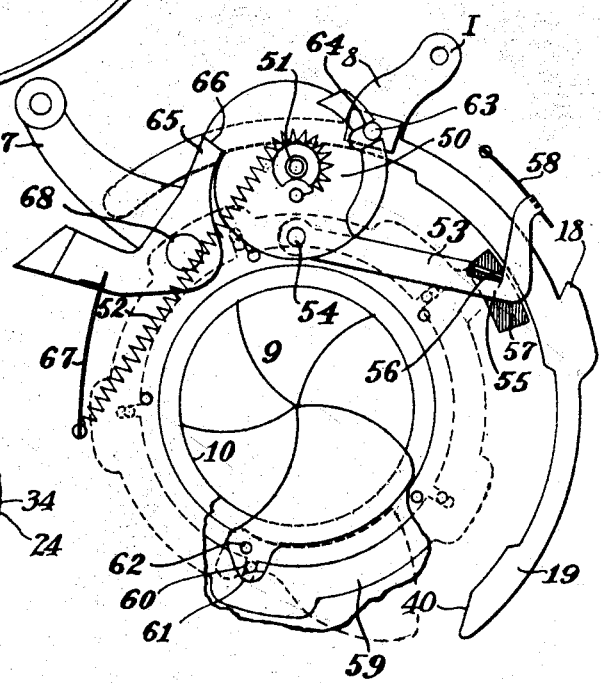
Fig. 6 is a plan view of the shutter setting lever and parts of the shutter mechanism removed from the shutter casing.

A latch member 53 is pivotally attached at 54 to the master member and carries a hook-like member 55 adapted to engage a blade ring lug 56 which extends upwardly through a slot 57 in a shutter mechanism plate and a spring 58 normally holds the latch in engagement with a blade ring lug. The blade ring lug 56 is carried by a blade ring 59 which has a plurality of slots 60 engaging upstanding pins 61 on the end of the shutter blades 9, these shutter blades being pivotally mounted at 62 to the shutter. Thus when the blade ring is rocked in a clockwise direction the blades are swung open and, as the latch member 53 is carried in a counter-clockwise direction, the blades are moved to the full line position in Fig. 6 closing the shutter aperture 10.

The arcuate-shaped lever 19 operable by the handle 8 forms a portion of the master member since it may set the master member through the engagement of a pin 63 with a slot 64. The master member may be held in a set position by means of the latch member 65 engaging the latch element 66 on the master member, which parts engage when a spring 67 moves the trigger member 7 about its pivot 68 in a clockwise direction after the handle 8 has been moved to its I position in which position the shutter is fully set. When in this position, if the trigger is moved in a counter-clockwise direction, the master member will be released to make an exposure. The structure, as thus far described, forms a part of my two patents covering features of shutters having the same type of shutter operating mechanism.

The shutter blades 9 are, of course, normally closed covering the exposure aperture 10 in the shutter except at such times when the trigger 7 is depressed, during which time the shutter mechanism will open and close the blades to make an exposure of the duration indicated on the exposure scale 11, a pointer 12 indicating on the scale to what speed the shutter is set.

The diaphragm mechanism shown broadly as 13 in Fig. 4 may be adjusted by means of a stop 14, which is brought opposite to the desired graduation 15 on the diaphragm scale.

In accordance with my invention, if an operator desires to focus on the ground glass of a camera, it is unnecessary to disturb either the diaphragm setting or the speed setting to do this. Normally, with the usual type of between-the-lens shutter, it will be necessary for the operator to adjust the shutter speed to time, to depress the trigger to open the shutter blades, to move the diaphragm setting lever to its full open position, and then to focus on the ground glass. After all this is done, the shutter and diaphragm must be set so that it will then be necessary for the operator to move the adjusting ring 4 until the pointer 12 comes opposite the desired part of the scale 11 and to move the pointer 14 until it comes opposite the desired graduation 15 on the diaphragm scale. It is also necessary for an operator to depress the trigger to close the blades so that all these operations are confusing and the operator may well omit one of these necessary steps in preparing a shutter for exposure.

However, in accordance with my present invention, in order to focus, neither the speed scale or the diaphragm scale is adjusted in any way. In order to open the shutter blades 9 for focusing, the operator depresses the push button 16 to operate a blade arrestor, which in this case comprises a latch element 17 which is thus moved downwardly into the path of a portion 18 of an arcuate lever 19 forming a part of the shutter setting member 8. Member 17 is preferably formed with a V-shaped notch adapted to receive a complementary-shaped part 18 when the push button 16 has been depressed to its full extent. However, a spring 20 normally thrusts the push button 16 upwardly into the position shown in Fig. 2. When in this position member 18 may move freely beneath the latch element 17 of the arrestor so that exposures of the normal type can then be made.

Figure 7:
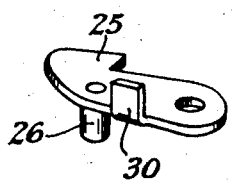
Fig. 7 is a perspective view of the diaphragm latch element removed from the shutter casing.

Assuming that the camera is to be focused and the push button 16 has been depressed as in Fig. 1, the parts are shown with the lever 8 in its position II in which the shutter blades 10 are arrested in a wide-opened position. Since it is usually desirable to focus a camera with the diaphragm in a fully open position, the operator then moves the diaphragm lever 22 in a clockwise direction, thus causing an upstanding lug 23 carried by the diaphragm ring 24 to snap behind the latch element 25 which, as shown in Fig. 7, is a hook-like lever with a downwardly extending pin 26. The latch element 25 is pivoted upon a stud 27 carried by the camera casing and a spring 28 pressing against a pin 29 and an upstanding lug 30 tends to turn the latch 25 in a clockwise direction.

The lever 22 which, as above explained, is attached to the diaphragm setting ring 24, is normally drawn in a counter-clockwise direction by means of a spring 31 attached to the lever at 32 and to the shutter at 33. This spring constantly tends to turn the diaphragm ring 24 in a counter-clockwise direction which in this instance is in the direction to close the diaphragm blades 34 to their smallest aperture. This diaphragm may be of the usual type in which blades 34 are pivotally attached to studs 35 passing into an upper ring which has been removed from Fig. 4, each blade having at its opposite end a stud 36 passing down into the adjustable blade ring 24. Consequently, as the ring 24 is turned and as the upper diaphragm blade ring is stationary, the blades are moved when the lever 22 is moved, the studs 36 riding back and forth in the slots 37 formed in the blade ring 24. Such diaphragm construction is of the usual type and is well known.

When the operator moves the lever 22 in a clockwise direction, he manually opens the shutter diaphragm and when the lug 23 on the diaphragm ring 24 snaps behind the latch element 25, the diaphragm will be held in its wide-opened position during the focusing movement. The operator may then focus on the ground glass in the usual manner and after this operation is completed in order to position the complete shutter for an exposure, it is only necessary for him to reset the shutter by moving the lever 8 from the II to the I position This accomplishes automatically the following functions: First, as the lever 8 is moved in a clockwise direction, it releases the interengaging arrestor elements 17 and 18, permitting spring 20 to withdraw the element 17 from the path of the element 18. Second, as the lever 8 is moved, it brings a cam 40, best shown in Fig. 6, into contact with the downwardly extending pin 26 on the latch element 25. Thus, the latch element is moved counter-clockwise against the pressure of spring 28 releasing the lug 23. When this occurs, there is nothing to hold the blade ring 24 against its tendency to close caused by spring 31 and, consequently, the blade ring 24 will move rapidly until an upstanding lug 41, best shown in Fig. 5, will come in contact with a pin 42 which predetermines the diaphragm opening selected by the operator.

Figure 5:
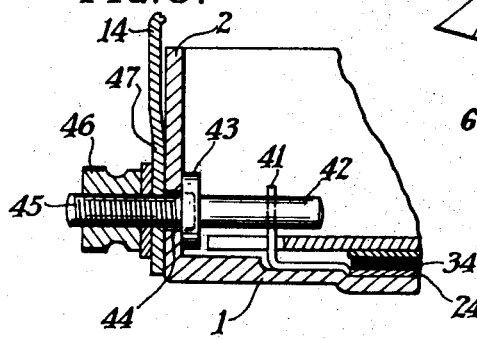
Fig. 5 is an enlarged fragmentary sectional view of line 5—5 of Fig. 4.

The pin 42 forms a part of an adjustable stop which may be positioned over any portion of the diaphragm scale. As indicated in Fig. 5, the pin includes a shoulder 43 resting against the inner wall of the upstanding flange 2 of the shutter casing 1. There is a slot 44 through the casing wall through which the pin passes, the outer end 45 being threaded to receive a nut 46 which is adapted to compress a spring 47, the ends of which, 48, slide in the slot 41. Thus, in order to set the diaphragm to any opening, an operator merely turns the nut 46 to such an extent that the pin 42 is unlocked and then slides the pointer 14 to the desired graduation on the diaphragm scale 15. Having selected his position, the nut is then tightened to hold the pin 42 projecting into the path of the diaphragm ring upstanding lug 41.

Since the lug 41 projects upwardly and since the pin 42 cannot be removed from the shutter when in use, it is impossible for the lug 41 to get on the right hand side of the pin 42 with reference to Fig. 4. This, of course, is necessary because if the pin could be withdrawn and the lug 41 could move to the right of pin 42, the spring 31 would hold the diaphragm in its closed position and the shutter would not function properly.

With a shutter of the construction above described, not only are many of the operations of focusing made easier, but it is also impossible to forget to manually move the diaphragm to a preselected stop before exposure. It is more or less customary with photographers and particularly with press photographers to operate at given diaphragm apertures under constant light conditions. If a photographer is one who, for instance, operates his camera at f/6.3, under certain light conditions, he merely sets his diaphragm setting member by turning the knurled nut 46 and moving it to 6.3 on the scale 15. If he should be operating a shutter at 1/400 of a second, he would move the pointer 12 by turning the ring 4 until it came opposite the proper graduation 11 on the speed setting dial. With these two settings, the speed setting and diaphragm setting in fixed positions, he could focus on the ground glass when required by performing only the simplest operation—that of setting the shutter and depressing the trigger 7 while at the same time depressing the push button 16. This would open the shutter blades. By swinging the lever 22 clockwise, he would then engage the latch elements 25 and 23 which would hold the diaphragm blades in a fully opened position. This movement would, of course, swing the upstanding lug 41 away from the stop pin 42, the distance away from the pin being determined by the particular diaphragm setting used. After focusing, he would then merely move the shutter setting lever 8 from the II position to the I position. This would completely position all of the shutter parts for the exposure he desired to make. It would automatically release the blade arrestor positioning element 17 out of the path of element 18. It would release the latch elements 25, 23 so that the spring 31 would immediately return the diaphragm from the fully opened position to the preselected stop. The operator could not forget to adjust his diaphragm because this would be done completely automatically. In order to make an exposure he would depress the trigger shutter 7 in the usual way, moving it from its latching position $a$ to its releasing $b$ so that the shutter blades 9 would open and close to make an exposure. Thus, the many operations which are usually necessary to focus on a ground glass when a camera having a between-the-lens type of shutter is used are entirely eliminated and the few remaining operations are ones which can be quickly and easily performed.

I claim:

1. In a photographic shutter of the type including a casing, shutter leaves movably mounted therein to open and close an exposure aperture, a master member, and mechanism operable thereby for actuating the shutter leaves, a setting member movable in one direction for tensioning the master member thereby setting the shutter for an exposure, and a trigger for releasing the shutter, the combination with a diaphragm, of means tending to move the diaphragm in one direction, an adjustable stop for limiting the movement of the diaphragm, a latch movable to an operative position for holding the diaphragm against the means tending to move the diaphragm, said latch lying in the path of and being movable by the setting lever moving in a direction to set the master member whereby the tensioning of the shutter by the setting lever may release the latch and the diaphragm may move up against the adjustable stop.

2. In a photographic shutter of the type including a casing, shutter leaves movably mounted therein to open and close an exposure aperture, a master member, and mechanism operable thereby for actuating the shutter leaves, a setting member movable in one direction for tensioning the master member thereby setting the shutter for an exposure, and a trigger for releasing the shutter, the combination with a diaphragm, of means tending to move the diaphragm towards a closed position, an adjustable stop to limit movement of the diaphragm towards a closed position, a latch for holding the diaphragm in an open position, and means for releasing said latch through operation of the shutter setting lever in a direction to tension the master member.

3. In a photographic shutter of the type including a casing, shutter leaves movably mounted therein to open and close an exposure aperture, a master member, and mechanism operable thereby for actuating the shutter leaves, a setting member for tensioning the master member thereby setting the shutter for an exposure, and a trigger for releasing the shutter, the combination with a diaphragm, of means tending to move the diaphragm towards a closed position, an adjustable stop to limit movement of the diaphragm toward a closed position, a latch for holding the diaphragm in an open position, and means for releasing said latch including an extension carried by the setting lever positioned to disengage said latch when the setting lever is moved to set the shutter.

4. In a photographic shutter of the type including a casing, shutter leaves movably mounted therein to open and close an exposure aperture, a master member, and mechanism operable thereby for actuating the shutter leaves, a setting member for tensioning the master member thereby setting the shutter for an exposure, and a trigger for releasing the shutter, the combination with a diaphragm, of means tending to move the diaphragm toward a closed position, an adjustable stop to limit movement of the diaphragm toward a closed position, a latch for holding the diaphragm in an open position pivoted to the shutter and spring pressed radially with respect thereto, said diaphragm including an arcuately movable lug adapted to be engaged by said latch member, said shutter setting member including an oscillatable arm and a means carried by said arm for moving said latch member radially to disengage the arcuately movable lug when the setting member is moved to set the shutter for making an exposure.

5. In a photographic shutter of the type including a casing, shutter leaves movably mounted therein to open and close an exposure aperture, a master member and means for setting the master member, the combination with mechanism for opening and closing the shutter blades by the master member, of a blade arrestor for holding the shutter blades open for focusing, a diaphragm, a spring for moving the diaphragm toward a closed position, an adjustable stop for limiting the movement of the diaphragm under the impulse of the spring, and releasable connections between the diaphragm and the shutter for holding the diaphragm open against spring pressure for focusing while the shutter blades are held open by the blade arrestor, said releasable connections lying in the path of the means for setting the master member and being movable thereby to release said connections between the diaphragm and the shutter when said setting lever is moved to set the shutter.

6. In a photographic shutter of the type including a casing, shutter leaves movably mounted therein to open and close an exposure aperture, a master member and means for setting the master member, the combination with the mechanism for opening and closing the shutter blades by the master member, of a blade arrestor for holding the shutter blades open for focusing including a means for holding the means for setting the master member against movement in a predetermined position in which the shutter blades may be held open, a diaphragm, a spring tending to close the diaphragm, an adjustable stop for limiting diaphragm movement under spring pressure, a latch comprising an element carried by the means for setting the master member and an element movably mounted on the shutter and in the path of the means for setting the master member, said latch elements being positioned to hold the diaphragm leaves in a fully open position, and being releasable through movement of the means for setting the master member, whereby said shutter leaves may close and said diaphragm may move to a predetermined opening against said adjustable stop and under the impulse of its spring and prior to an exposure.

WILLIAM A. RIDDELL.